(12) United States Patent
Shtuchkin et al.

(10) Patent No.: US 10,540,635 B2
(45) Date of Patent: Jan. 21, 2020

(54) SYSTEM AND METHOD FOR GENERATING DESKTOP FOCUS WORK AREAS

(71) Applicant: Dropbox, Inc., San Francisco, CA (US)

(72) Inventors: Alexander Shtuchkin, San Francisco, CA (US); Olga Stepanova, San Francisco, CA (US); Pranav Piyush, Burlingame, CA (US)

(73) Assignee: Dropbox, Inc., San Francisco, CA (US)

( * ) Notice: Subject to any disclaimer, the term of this patent is extended or adjusted under 35 U.S.C. 154(b) by 344 days.

(21) Appl. No.: 15/395,897

(22) Filed: Dec. 30, 2016

(65) Prior Publication Data

US 2018/0188901 A1 Jul. 5, 2018

(51) Int. Cl.
*G06F 3/0482* (2013.01)
*G06Q 10/10* (2012.01)

(52) U.S. Cl.
CPC .................... *G06Q 10/10* (2013.01)

(58) Field of Classification Search
CPC .............. G06F 3/0482; G06F 3/0481; G06F 2203/04803; G06Q 10/10
See application file for complete search history.

(56) References Cited

U.S. PATENT DOCUMENTS

| | | | |
|---|---|---|---|
| 7,917,528 B1 * | 3/2011 | Dave | G06F 16/3322 707/766 |
| 8,312,385 B2 | 11/2012 | Bier | |
| 8,793,650 B2 * | 7/2014 | Hilerio | G06F 8/61 717/115 |
| 9,152,299 B2 | 10/2015 | McCann et al. | |
| 2002/0186257 A1 * | 12/2002 | Cadiz | G06F 16/9535 715/838 |
| 2003/0131016 A1 | 7/2003 | Tanny et al. | |
| 2004/0212640 A1 * | 10/2004 | Mann | G06F 3/0481 715/792 |
| 2005/0060664 A1 * | 3/2005 | Rogers | G06F 3/0481 715/810 |
| 2005/0091314 A1 * | 4/2005 | Blagsvedt | G06Q 10/10 709/204 |

(Continued)

OTHER PUBLICATIONS

"Pagico—Manage all your projects and clients in one app.", https://www.pagico.com/, NOTES17 (N17), Indianapolis, IN, 2016 (Downloaded Dec. 7, 2016 from https://www.pagico.com/).

*Primary Examiner* — Phenuel S Salomon
(74) *Attorney, Agent, or Firm* — Polsinelli PC

(57) ABSTRACT

In some embodiments, a client application at a computing device can receive a request to generate a digital focus area based on input criteria. In response to the request, the client application can search a local storage and/or a remote storage for content related to the input criteria to yield a content collection, the remote storage being associated with a user account registered at a content management system. The client application can generate a workspace for the digital focus area, the workspace containing selected content from the content collection. The client application can pin, to a desktop displayed on the computing device, an interface object associated with the digital focus area, the interface object providing access to the workspace. The client application can then monitor events associated with the input criteria, and update the digital focus area based on one or more of the events associated with the input criteria.

19 Claims, 15 Drawing Sheets

(56) References Cited

U.S. PATENT DOCUMENTS

| | | | | |
|---|---|---|---|---|
| 2005/0198584 A1* | 9/2005 | Matthews | G06F 3/0482 | 715/779 |
| 2005/0289478 A1* | 12/2005 | Landman | G06F 3/048 | 715/804 |
| 2006/0168538 A1* | 7/2006 | Stevens | G06F 3/04817 | 715/779 |
| 2006/0218503 A1* | 9/2006 | Matthews | G06F 3/0482 | 715/779 |
| 2007/0044029 A1* | 2/2007 | Fisher | G06F 9/45512 | 715/762 |
| 2007/0074126 A1* | 3/2007 | Fisher | G06F 9/451 | 715/764 |
| 2007/0113188 A1* | 5/2007 | Bales | G06F 16/958 | 715/742 |
| 2007/0157107 A1* | 7/2007 | Bishop | H04L 67/36 | 715/771 |
| 2007/0180401 A1* | 8/2007 | Singh | G06F 3/0481 | 715/794 |
| 2008/0184159 A1* | 7/2008 | Selig | G06F 17/243 | 715/781 |
| 2010/0030734 A1* | 2/2010 | Chunilal | G06Q 10/00 | 707/770 |
| 2011/0078615 A1* | 3/2011 | Bier | G06Q 10/10 | 715/779 |
| 2011/0179350 A1* | 7/2011 | Capela | G06F 17/211 | 715/244 |
| 2012/0054674 A1* | 3/2012 | Beykpour | G06F 3/0481 | 715/788 |
| 2012/0110508 A1 | 5/2012 | Bullen | | |
| 2012/0143931 A1* | 6/2012 | Rosenberger | G06F 16/14 | 707/828 |
| 2013/0117714 A1* | 5/2013 | Rhee | G06F 17/245 | 715/823 |
| 2013/0159926 A1* | 6/2013 | Vainer | G06F 17/2785 | 715/804 |
| 2013/0268889 A1* | 10/2013 | Barak | G06F 3/048 | 715/825 |
| 2013/0311870 A1* | 11/2013 | Worsley | G06F 17/217 | 715/234 |
| 2013/0330019 A1* | 12/2013 | Kim | G06T 11/60 | 382/298 |
| 2014/0282206 A1* | 9/2014 | Moore | G06F 3/0482 | 715/779 |
| 2015/0084883 A1* | 3/2015 | Kim | G06F 3/0488 | 345/173 |
| 2015/0228104 A1* | 8/2015 | Edwards | G06T 13/00 | 345/474 |

* cited by examiner

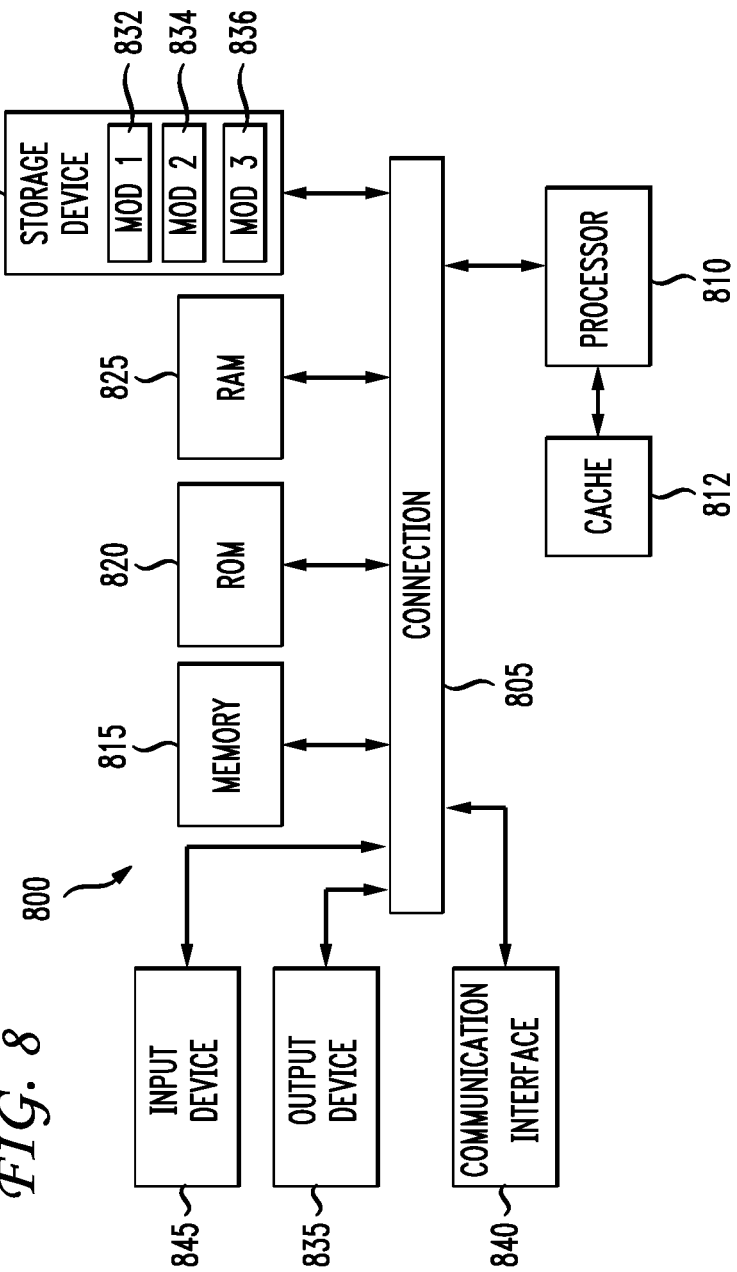

SYSTEM AND METHOD FOR GENERATING DESKTOP FOCUS WORK AREAS

TECHNICAL FIELD

The present technology pertains to computer workspaces, and more specifically pertains to generating desktop focus work areas.

BACKGROUND

The increasing variety of software and computer tools available to users has drastically shaped the way users work, interact, and conduct business. In fact, today users rely on software and computer tools for almost every aspect of their work. For example, users often communicate through electronic mail or messaging systems, create and modify files and documents using specific software applications, manage schedules and events through calendar applications, and store and access data from their computing systems. This widespread adoption of software and computer tools by users and businesses has had a profound impact on cost, user efficiency, and user collaboration.

However, the increasing diversity in software and computer tools used by users has also created unique challenges. For example, the large number of software and computer tools available to users can quickly overwhelm users with a high volume of electronic messages, alerts, and content items. Moreover, information can become disorganized and fragmented across multiple software and computer tools. As a result, users can have a difficult time tracking and accessing relevant portions of information in a timely fashion, and may even lose or overlook important items. In some cases, as the volume of available data, software, and computer tools increases, the cost, efficiency, and collaboration benefits of software and computer tools can steadily decline.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can enable users to create focus areas containing content items relevant to the focus area collected from different storage locations, software applications or services, platforms, devices, etc. The content items contained in a focus area can include, without limitation, files, documents, folders, activity, communications, users, etc. The focus areas can centralize the content items for easy access by the user from a desktop access point or interface, such as a sidebar object. The focus areas can dynamically and intelligently monitor activity and events across different applications, devices, user accounts, etc., and interact with a user based on relevant events and activity detected for the focus areas. The focus areas can also auto populate content items from a variety of sources and locations, and shared with other users. For example, members can be added to focus areas in order to share the focus areas with different users.

Disclosed are systems, methods, and non-transitory computer-readable storage media for generating desktop focus work areas. In some examples, a method can involve receiving, by a first software application at a computing device, a request to generate a digital focus area based on input criteria. The request can include the input criteria for the focus area. The input criteria can define, for example, a particular topic, project, characteristic, parameter, etc. For example, the input criteria can define a topic for creating a digital focus area related to "Project X".

The method can further involve searching, by the first software application, a local storage and/or a remote storage for content items related to the topic to yield a content collection. The local storage can include a physical or logical storage on the computing device. The remote storage can include storage from an online or cloud content management system, a network storage system, a remote device, etc. For example, the remote storage can include a storage on a content management system allocated for a user account registered at the content management system.

The first software application can connect with other software applications or services to search for content items associated with the other software applications or services. For example, the first software application can search electronic emails (emails) associated with an email application, documents on a local file system, calendar items associated with a calendar application, content items associated with a synchronized content management system service, etc.

The content collection can include, without limitation, emails, text messages, folders, files, documents, images, videos, logs, activity information, links, content packages, etc. The content items in the content collection can be related to the topic and thus searched and identified based on the topic. However, the content items can also be searched and identified based on other common factors or characteristics, such as a date, a type, a size, a history, metadata, associated user activity, etc.

The method can also involve generating, by the first software application, a workspace for the digital focus area. The workspace can contain selected content items from the content collection. The selected content items can be manually selected by one or more users, but may also be intelligently selected by the first software application based on an algorithm, such as a machine learning algorithm. In one example, the first software application can intelligently search for suggested content items to create the content collection and allow the user to select or add specific content items from the content collection. In another example, the first software application can auto populate the workspace with content items selected by the first software application based on a threshold relevance. Users can also manually add or select content items to be added to the workspace which may not be included in the content collection.

The method can further involve pinning to, or presenting on, a desktop displayed on the computing device, an interface object associated with the digital focus area. The interface object can provide user access to the workspace. For example, the interface object can be a selectable image, icon, note, or graphical element presented on a sidebar or panel displayed on the desktop, which allows the user to access or launch the workspace.

The method can involve monitoring, by the first software application, events associated with the input criteria, and updating the digital focus area based on one or more of the events associated with the input criteria. For example, the first software application can monitor and detect user activity that may be pertinent to the input criteria or digital focus area, and automatically update the digital focus area based on the detected user activity. The first software application can update the digital focus area by, without limitation, modifying a content item of the workspace, modifying a presentation of the interface object, displaying notifications related to the digital focus area, automatically connecting or relating the user activity to the digital focus area, generating visual suggestions for a user, etc.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8 illustrates an example system embodiment.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for effective and efficient management of related data, communications, and functionalities across disparate platforms, software applications, users, devices, and storage systems. Disclosed are systems, methods, and computer-readable media for generating desktop focus work areas which provide improved and efficient management of related data, communications, and functionalities across disparate platforms, software applications, users, devices, and storage systems.

Figure 1A:
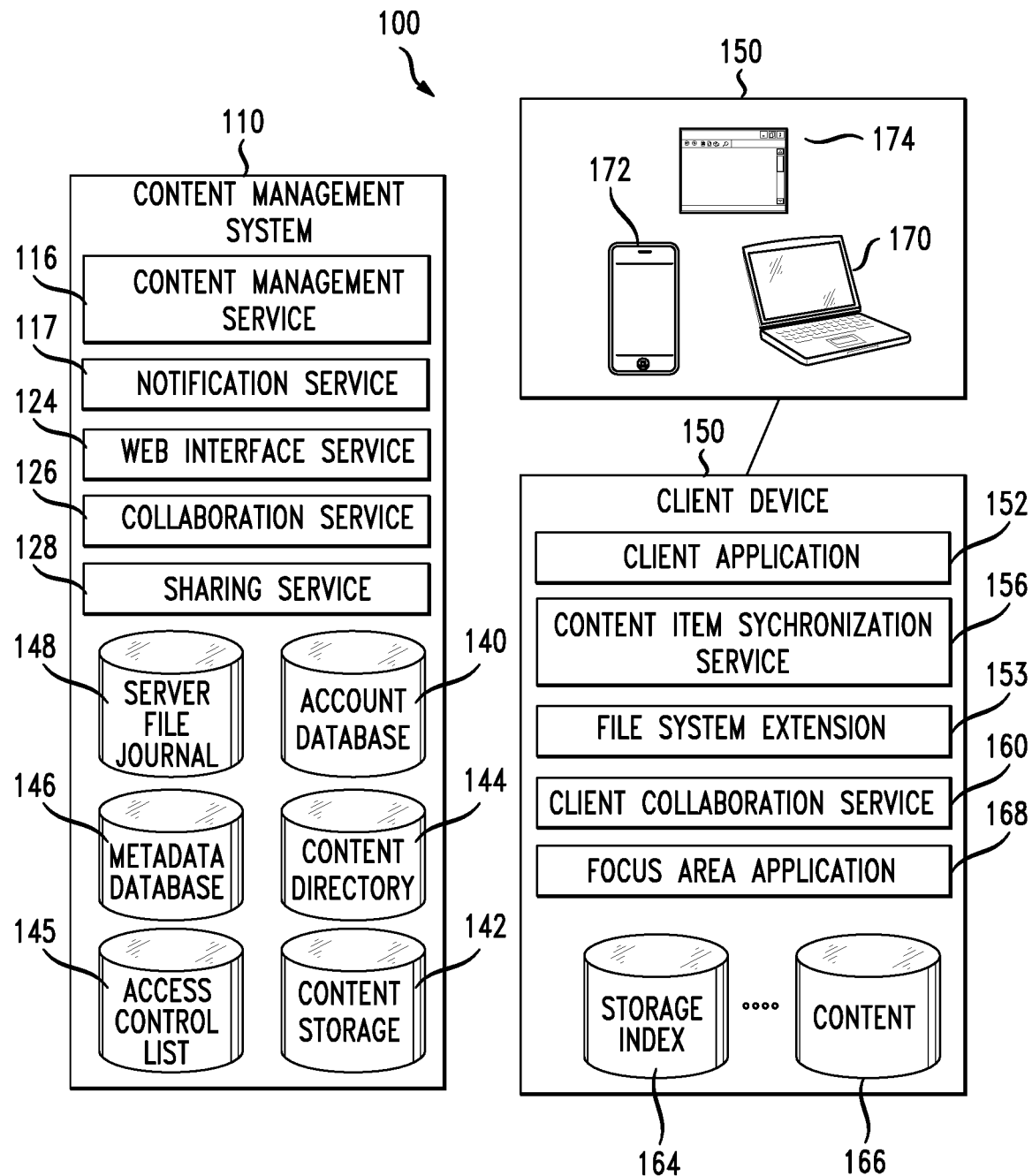
FIG. 1A illustrates an example system configuration of a content management system and client devices.
Figure 1B:
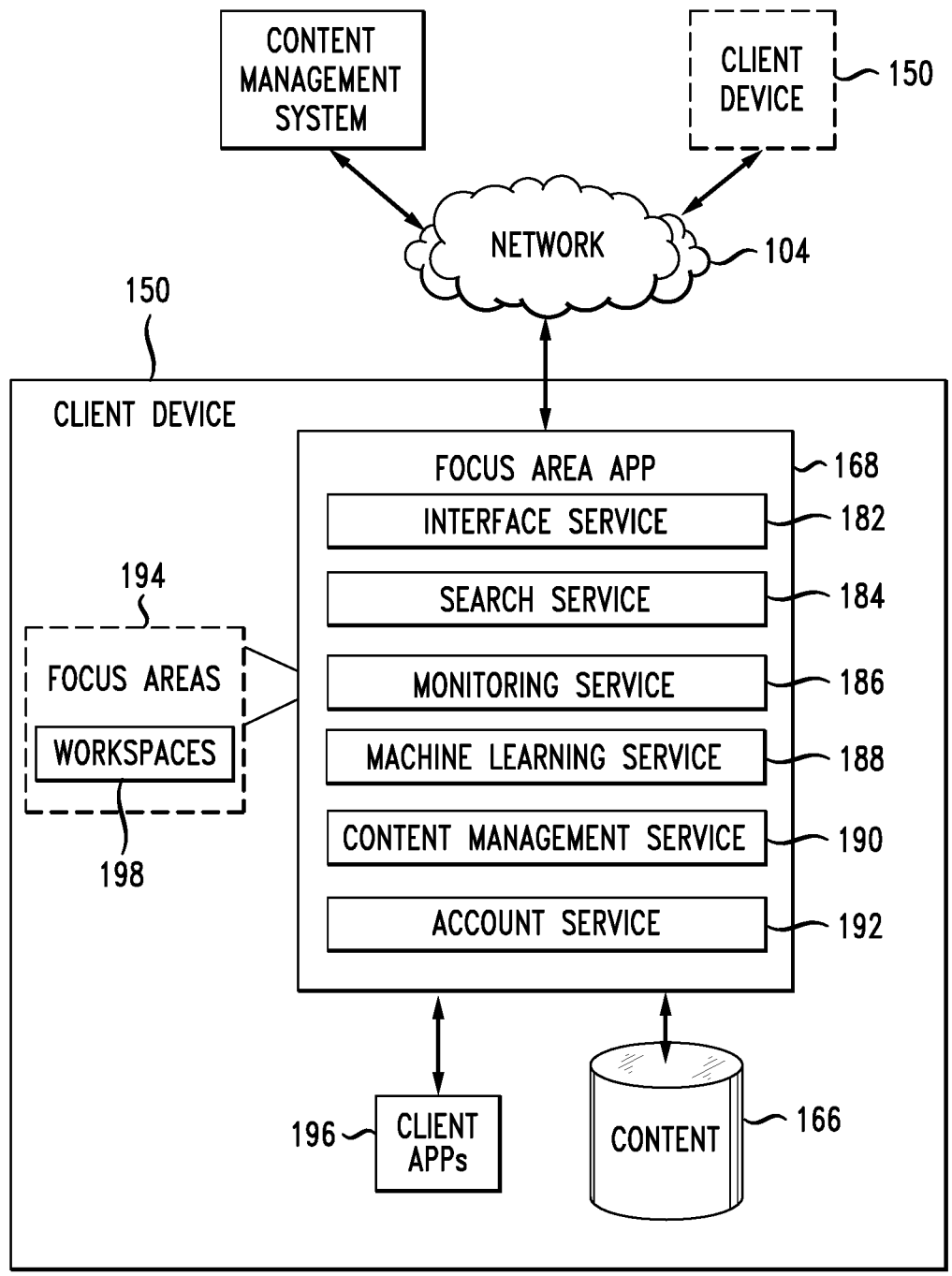
FIG. 1B illustrates an example system configuration of a focus area application in an environment including a content management system and client devices.

A description of example network environments and system architectures for generating desktop focus areas, as shown in FIGS. 1A and 1B, is first disclosed herein. A discussion of desktop focus areas and related concepts, as illustrated in FIGS. 2-7, will then follow. The discussion concludes with a brief description of an example computing device, as illustrated in FIG. 8, which can be configured to implement desktop focus areas as described herein. Variations shall be described herein as the various examples and features are set forth. The disclosure now turns to FIG. 1A.

In some embodiments the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 145. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150 or focus area application 168 on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from within a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface.

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 160 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

Focus Areas.

Client device 150 can include focus area application 168 for generating and managing focus areas, as well as related content items and events, as further described below. Focus area application 168 can communicate and/or interact with client application 152 and/or any of services 156, 153, 160 on client device 150. Focus area application 168 can also interact with content management system 110, as well as other client devices running focus area application 168.

Focus area application 168 can collect related content items, activities, events, etc., into a focus area which can be accessed by users at client device 150 through focus area application 168. Information and content items associated with a focus area can be maintained or collected in a centralized manner for access by users at client device 150. Content collected for a focus area can include content items from content 166, which can include one or more local storage devices or areas on client device 150, and content storage 142, for example. Focus area application 168 can also maintain focus area content and information synchronized with content management system 110 and/or other client devices running focus area application 168. Additional examples, features, and details of focus area application 168 are described below with reference to FIG. 1B and FIGS. 2-7.

While system 100 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

Referring to FIG. 1B, focus area application 168 on client device 150 can be configured to generate and manage focus areas 194 as further described below with respect to FIGS. 2-7. Focus areas 194 can centralize content items, tools, communications, services, etc., for a respective area of focus (e.g., topic or subject, project, team, and/or any other parameter such as date, content type, etc.), from across various locations and/or software applications in client device 150, content management system 110, and/or other client devices. Focus areas 194 can also provide a graphical interface for users to interact with focus areas 194 from focus area application 168 on client device 150 and/or any other client devices. Focus area application 168 can also update focus areas 194 and intelligently interact with users, devices, content items, and software applications, as further explained below.

Focus area application 168 can include interface service 182 for communicating and/or interacting with other applications and software, which can include applications and software on client device 150 (e.g., client applications 196) and/or one or more remote systems (e.g., content management system 110, remote client device 150, etc.). Client device 150 and focus area application 168 can communicate with other devices, such as content management system 110, over network 104, which can include one or more private networks, such as a local area network (LAN) and/or one or more public networks such as the Internet.

Search service 184 can generate queries and perform searches for content items related to particular focus areas 194. The content items can include, without limitation, emails, files, folders, communications, documents, media items, etc. Search service 184 can perform searches in content 166 on client device 150 and/or remote locations such as content management system 110 and other remote client devices. Searches can include content items from other software and applications, such as client applications 196 on client device 150.

Moreover, searching can be specific to any of the focus areas 194. Thus, the searches or queries can be defined by one or more factors related to a focus area, such as a topic or subject, a preference, a user input, a context, a semantic relationship, a user or device, a user account, a content characteristic (e.g., size, extension, date, author, etc.), a history, and/or any other parameter.

Monitoring service 186 can be configured to monitor content items and/or activities related to focus areas 194 in order to update content items, generate events, or perform modifications to focus areas 194. For example, monitoring service 186 can monitor user activity at client device 150 (e.g., what applications are in use, which application is in focus or in the foreground, what inputs have been provided by the user, what content item(s) the user has accessed, where the user has navigated, etc.), a context at client device 150 (e.g., what services are running, what applications are in use, etc.), changes or updates to content item(s) associated with a particular focus area, events related to a particular focus area (e.g., calendar events such as deadlines or meetings, synchronization events, discussions such as emails or instant messages, etc.), conditions, preferences, rules, etc.

Machine learning service 188 can be configured to use machine learning in order to identify content items, activities, etc., that are related to particular focus areas 194. Machine learning service 188 can use data obtained by monitoring service 186, such as context or activity data, preference settings, user behavior data, characteristics associated with particular focus areas 194, profile information, rules and other information to generate predictions, decisions, updates, filters, relationships, suggestions, etc. For example, machine learning service 188 can predict that a content item is related to a focus area and prompt the focus area application 168 to add the content item to a particular focus area from the focus areas 194. As another example, machine learning service 188 may predict that user A should be added as a member of focus area X and generate a notification or suggestion to adding user A as a member of focus area X.

Machine learning service 188 can also classify content items or inputs, cluster content items or inputs, simplify content items or inputs, etc., which can help focus area application 168 search and identify content items or events of particular relevance and make different connections between content items or events.

Content management service 190 can manage content items, events, communications, etc., for focus areas 194. For example, content management service 190 can add, remove, modify content items in a focus area, add members or permissions to a focus area, generate discussions or messages for a focus area, etc. Content management service 190 can create respective workspaces 198 for focus areas 194. Workspaces 198 can serve as respective repositories for focus areas 194, including respective content items, links to content items (e.g., symbolic links, network paths, URLs, etc.), events, logs, discussions, rules, preferences, tools, etc., associated with focus areas 194. Workspaces 198 can also provide the support for interacting with users through, for example, notifications, messages, emails, alerts, visual signals, etc.

Accounts service 192 can manage user accounts for focus area application 168, profiles for the user accounts, security for the user accounts, preferences for the user accounts, etc. In some cases, accounts service 192 can host accounts and related information for focus area application 168. However, accounts service 192 may also enable authentication and sessions to be conducted on focus area application 168 based on user accounts from content management system 110. For example, accounts service 192 may synchronize accounts and information with content management system 110 (e.g., account database 140).

Figure 2A:
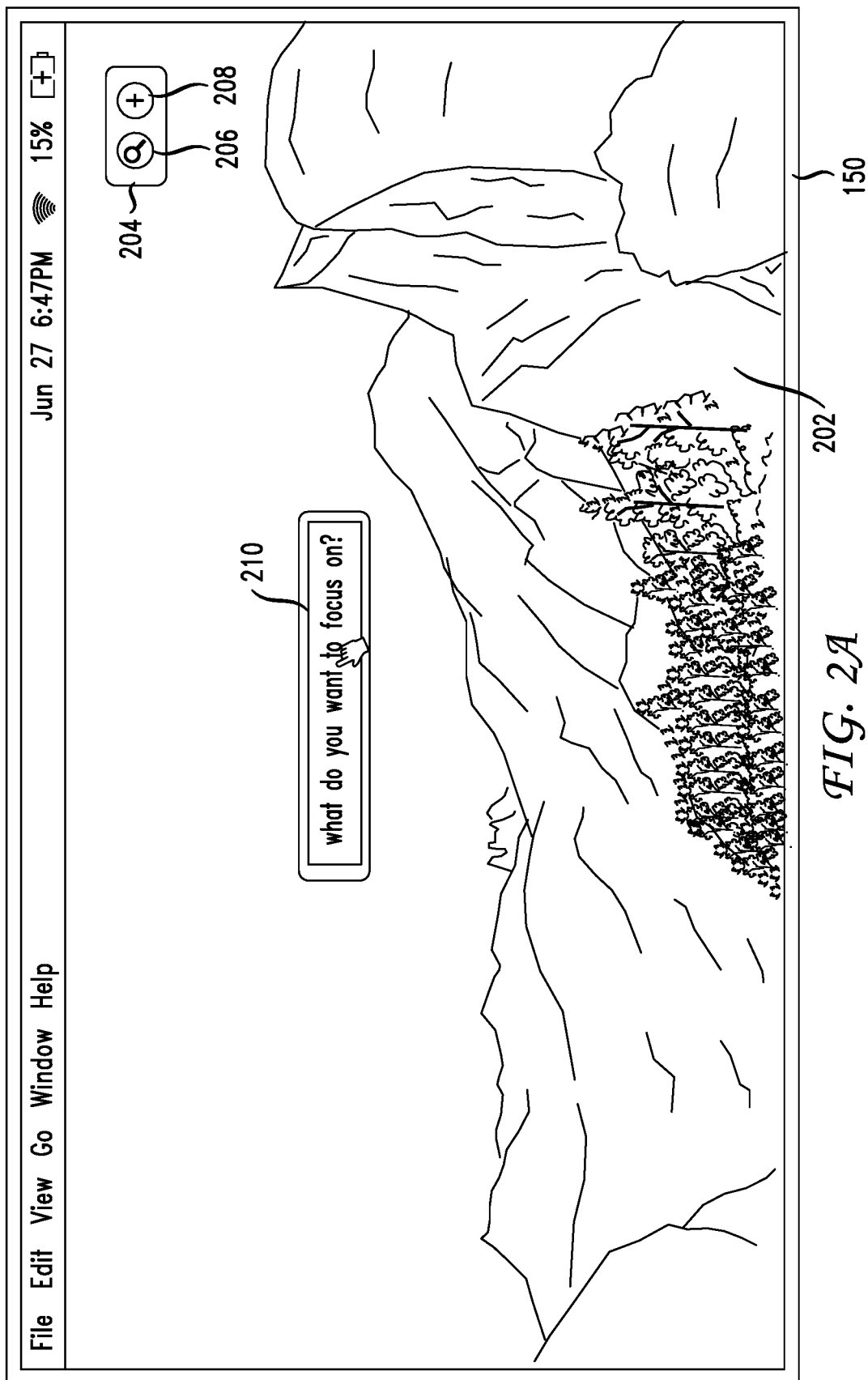
FIG. 2A illustrates an interface view for creating a focus area with a focus area application.

FIG. 2A illustrates an example interface view for creating a focus area with focus area application 168. Focus area application 168 can include control element 204 for managing focus areas on client device 150. Control element 204 can be displayed on interface 202, which can include a desktop interface provided by an operating system of client device 150.

Control element 204 can include a search control 206 for searching focus areas in focus area application 168 and/or content items in the focus areas in focus area application 168. Control element 204 can also include new focus area element 208 for creating new focus areas in focus area application 168.

Input control element 210 can be presented on interface 202 when new focus area element 208 is selected. Input control element 210 can enable a user input criteria, such as a title, topic, or parameter, for creating a new focus area. For example, a user can input Topic A in input control element 210 to generate a focus area for Topic A.

Figure 2B:
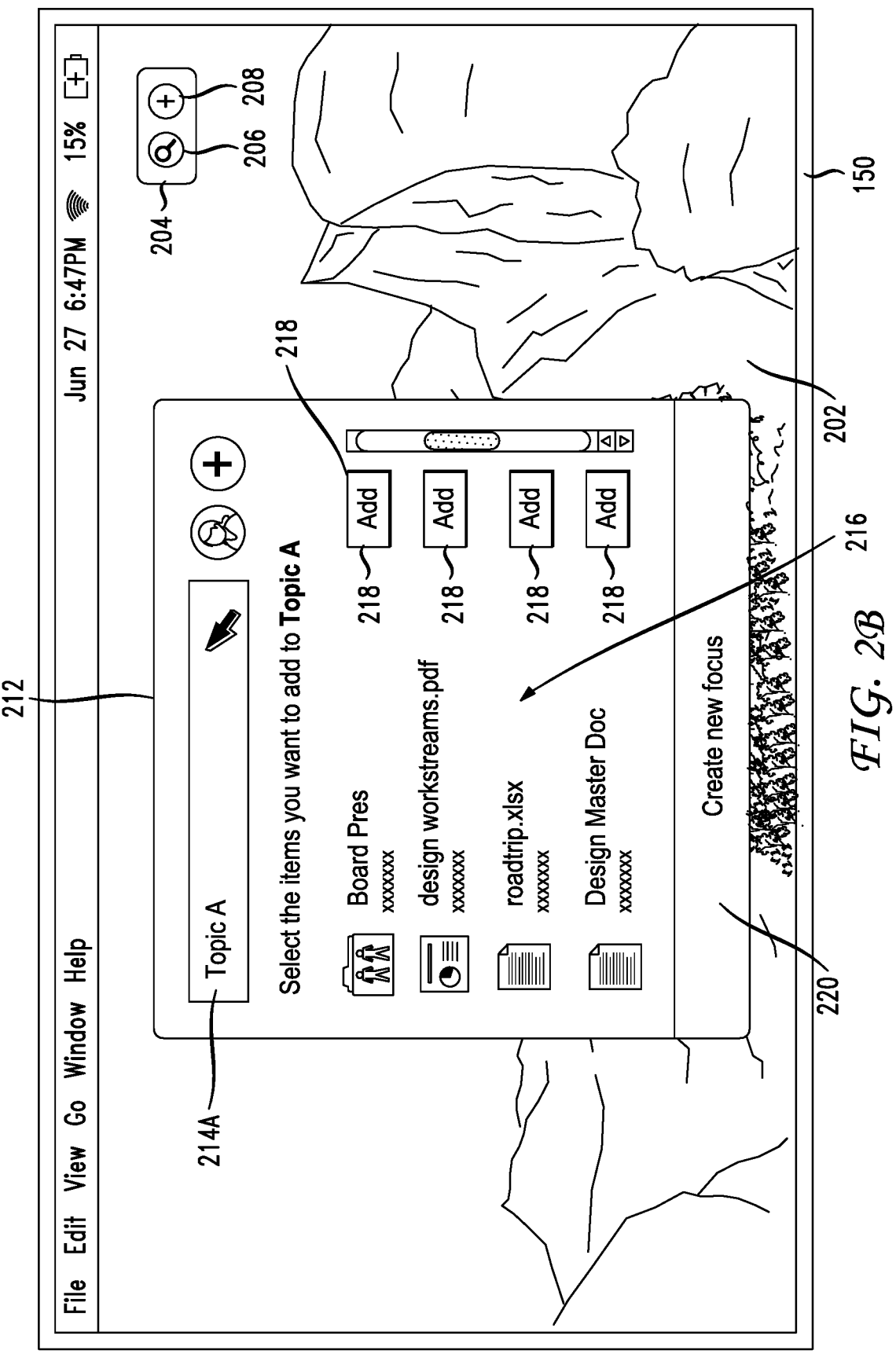
FIG. 2B illustrates an interface for configuring a new focus area with a focus area application.

Referring to FIG. 2B, when the user enters an input (e.g., Topic A) in input control element 210, focus area application 168 can generate new focus area configuration window 212 for finalizing the creation of the new focus area, including adding content items and members.

New focus area configuration window 212 can include focus area name 214A and a list 216 of content items pertinent to the new focus area. The content items in list 216 can be content items identified by focus area application 168 to be relevant to the new focus area based on, without limitation, focus area name 214A, any portion of input received via input control element 210, user preferences, etc. The content items in list 216 can include content items stored locally on client device 150, content items stored remotely on content management system 110, content items shared and synchronized across various devices, content items associated with other applications on client device 150, etc.

New focus area configuration window 212 can include respective selection elements 218 for selecting specific content items in list 216. This way, a user can specifically select content items from list 216 to be included in the new focus area and ignore other content items found by focus area application 168 that the user may not want to include. New focus area configuration window 212 can also include create new focus element 220, which the user can select to trigger the new focus area to be created based on the configuration settings from new focus area configuration window 212.

Figure 2C:
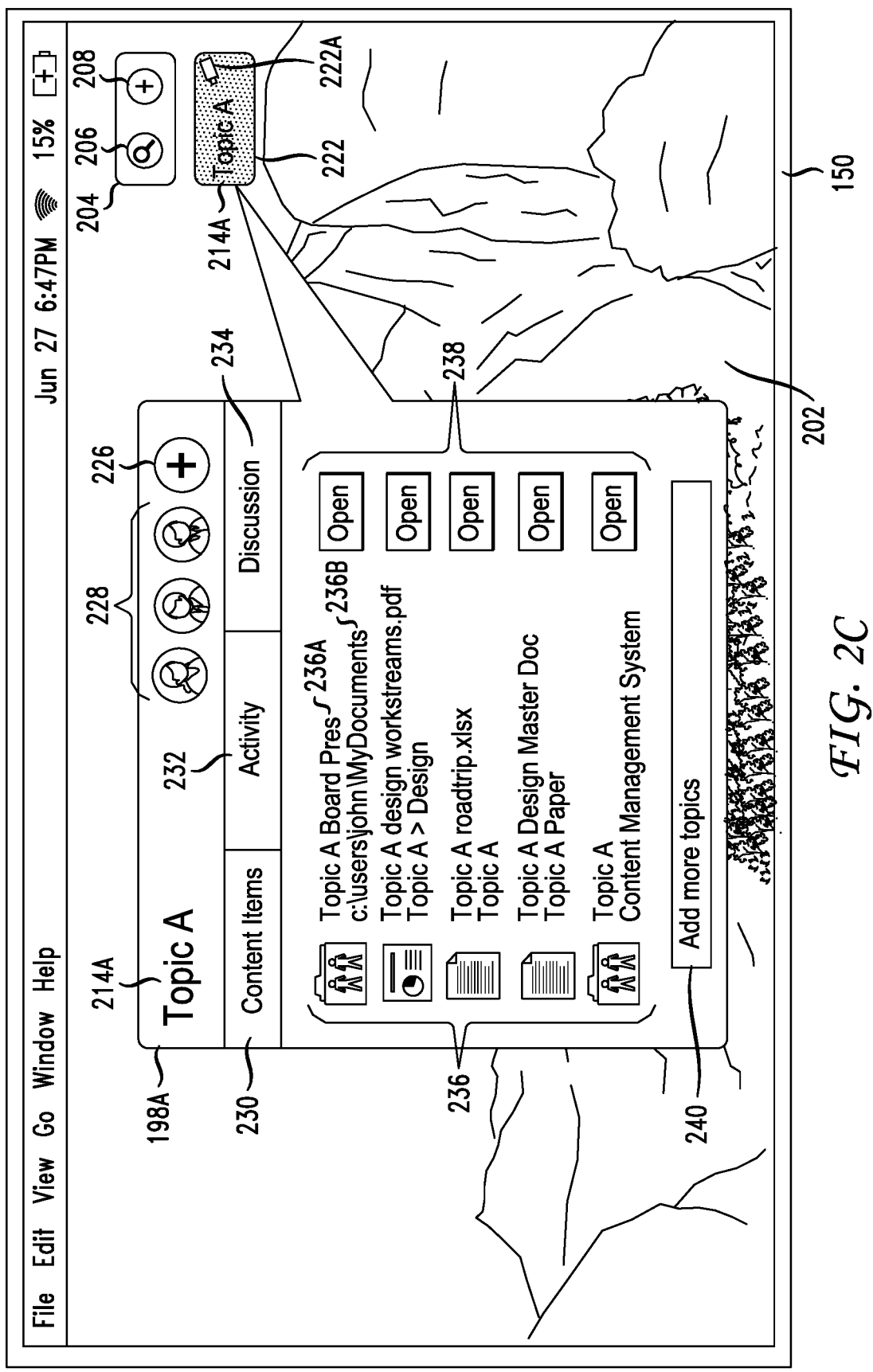
FIG. 2C illustrates a focus area created with a focus area application.

Referring to FIG. 2C, once the submit element 220 has been selected to create the new focus area, focus area application 168 can generate interface object 222 for the new focus area and workspace 198A for the new focus area. Interface object 222 can be presented on the desktop (i.e., interface 202) and may display focus area name 214A associated with the new focus area. Interface object 222 can also be pinned to the desktop via pin element 222A. For example, interface object 222 can be pinned to a sidebar of focus area application 168 on the desktop.

Focus area name 214A on interface object 222 can help a user identify the focus area corresponding to interface object 222. Interface object 222 can also display other information, signals, patterns, notifications, etc., and/or change appearance based on a current context or activity, as further described below. For example, interface object 222 can display a notification or change colors when a new item is added to workspace 198A.

Moreover, interface object 222 can enable a user to access workspace 198A for the new focus area associated with interface object 222. For example, a user input or gesture selecting interface object 222 can cause focus area application 168 to present workspace 198A corresponding to the focus area associated with interface object 222. Thus, interface object 222 can allow a user to launch workspace 198A.

Workspace 198A can display focus area name 214A associated with the focus area of workspace 198A and interface object 222, which can help a user identify the focus area corresponding to workspace 198A. Workspace 198A can include members list 228, which shows which user accounts are members of the focus area associated with workspace 198A. Workspace 198A can also include add members element 226, which allows a user to add new members to the focus area associated with workspace 198A and interface object 222.

Workspace 198A can include tabs 230, 232, 234 for accessing different categories of content items associated with the focus area corresponding to workspace 198A. For example, workspace 198A can include content items tab 230 displaying content items 236 in workspace 198A, activity tab 232 for displaying activity related to the focus area associated with workspace 198A, and discussion tab 234 for displaying communications (e.g., messages, emails, etc.) contained in workspace 198A.

Content items 236 can include, without limitation, files, folders, projections, containers, etc. Moreover, content items 236 can be displayed in content items tab 230 along with pertinent data 236A-B, such as title 236A and location 236B. Location 236B can identify a storage location (e.g., storage drive or device, path within a filesystem hierarchy, etc.), a network location (e.g., network path, URL, server or DNS name, remote location, etc.), focus area location, location within a separate software application, etc.

Workspace 198A can also include objects 238 for selecting and accessing an associated document from content items 236. Users can thus open and interact with any item from content items 236 via objects 238. Content items 236 can also be accessed or opened by users in other ways, including gestures and user inputs. For example, content items 236 can be user-selectable via, for example, a link to the actual content item.

Input area 240 can allow a user to add new content item(s) to workspace 198A. For example, the user can enter a filename or search query for searching a specific file to be added to workspace 198A. Focus area application 168 can receive input via input area 240 and perform a search for relevant content items. The search can be conducted on local content items but may also be extended to include remote content items, such as content items on content management system 110. Users can also drag and drop content items into input area 240 to add the content items to workspace 198A. For example, a user can drag and drop a file into input area 240 to add the file to workspace 198A.

Figure 2D:
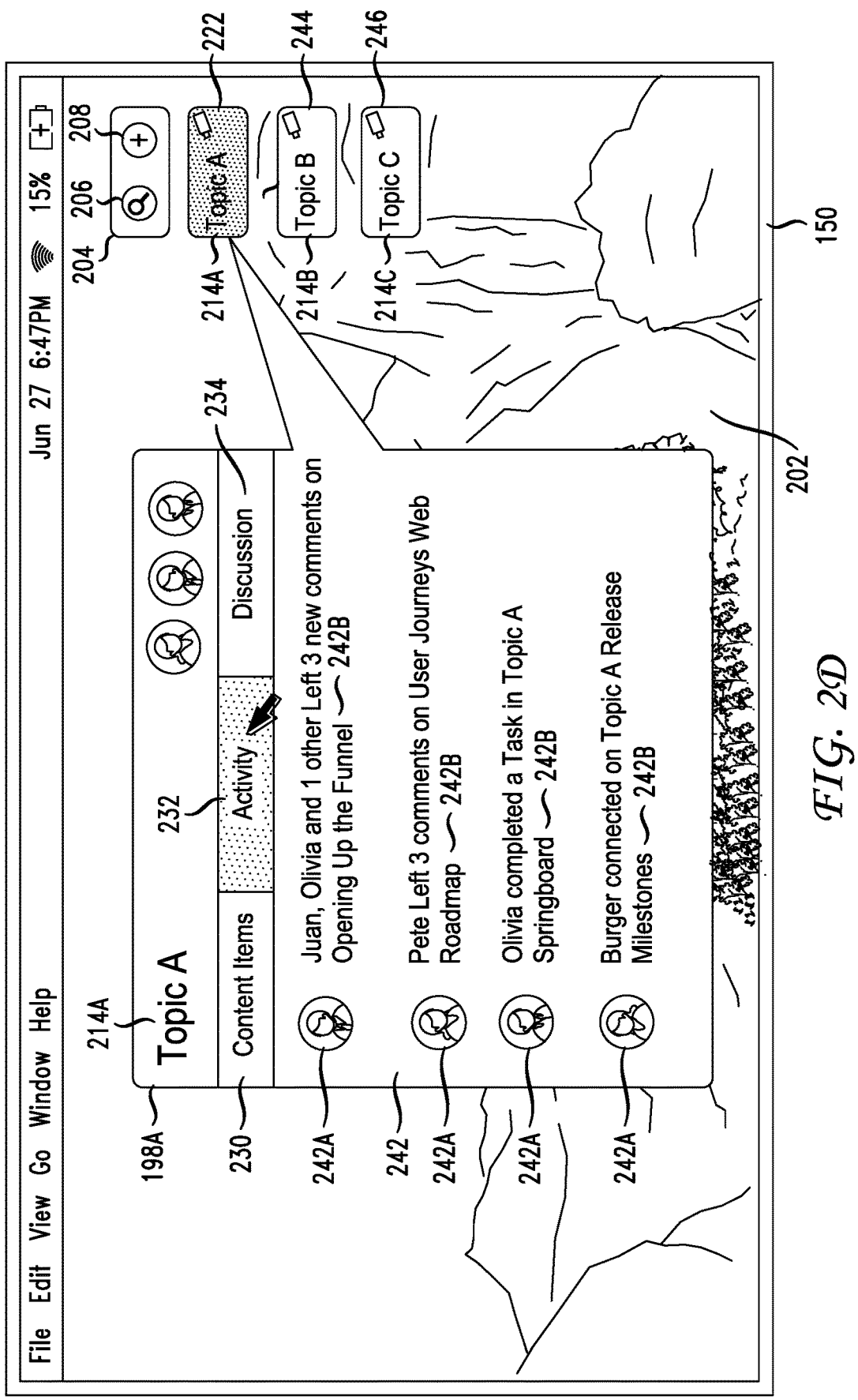
FIG. 2D illustrates a view of a focus area workspace and multiple focus areas presented on an interface.

Referring to FIG. 2D, activity tab 232 can display activity screen 242, which can include individual activity entries 242B and display respective users 242A pertaining to the individual activity entries 242B. For example, individual activity entries 242B can describe or summarize activities associated with the focus area corresponding to workspace 198A, such as comments added to workspace 198A; tasks performed in workspace 198A such as adding, removing, or modifying content items in workspace 198A; adding or removing members to or from the focus area of workspace 198A; events that transpired, which relate to the focus area of workspace 198A and/or any content item(s) in workspace 198A; etc. Activity screen 242 can also display other information associated with individual activity entries 242B, such as a timestamp, location information, metadata, follow up information or activities, etc.

As shown in FIG. 2D, interface objects 244, 246 associated with other focus areas created with focus area application 168 can also be displayed on the desktop of interface 202. Thus, from control element 204, a user can create various different focus areas using new focus area element 208 for creating new focus areas and search existing focus areas using search control 206.

Like interface object 222, interface objects 244, 246 can also display respective focus area names 214B, 214C, and may be associated with respective workspaces for their corresponding focus areas. Moreover, interface objects 222, 244, 246 can be presented on the desktop of interface 202 according to different arrangements, appearances, patterns, etc. For example, interface objects 222, 244, 246 can be displayed in an order of creation, an order of usage (e.g., last used or modified), an order of importance (e.g., priorities), etc. Appearance characteristics can also vary based on one or more factors. For example, a size or color of interface objects 222, 244, 246 can be based on an amount of content items associated with their respective focus areas, an amount of space remaining to reach a threshold limit of content items for their respective focus areas, a frequency of use, etc. To illustrate, as the amount of content items contained in a respective focus area of an interface object increases, the size or prominence of the interface object can be increased or the color appearance can be darkened.

Appearance characteristics can also vary based on current activity, context, usage, etc. For example, an interface object can be highlighted or may change colors to indicate an opened workspace is associated with that interface object, a content item belongs to the focus area associated with that interface object, a content item accessed by a user pertains to the focus area associated with that interface object, etc.

The number of interface objects displayed or active on desktop interface 202 can vary based on one or more factors, such as user preferences, display size or resolution associated with desktop interface 202 and/or client device 150, usage history, relevance to current activities or context at client device 150, etc. For example, the number of interface objects displayed on desktop interface 202 at one time can be limited by the user to 10 interface objects (e.g., 10 interface objects selected based on one or more factors such as amount of respective activity, amount of time since the last respective activity, respective priorities, sorting parameters, respective topics, membership information, size or amount of content items associated with respective focus areas, predicted relevance of respective focus areas based on usage and/or context information such usage patterns, etc.), only active interface objects or interface objects for active focus areas, only interface objects for focus areas active or used within a selected period of time, only interface objects for focus areas that have a specific commonality such as a common member, etc.

Note that any interface objects that are not displayed on desktop interface 202 (e.g., hiding interface objects, minimized interface objects, etc.) may still be accessible by the user via focus area application 168. For example, the user can access an interface object that was previously created but not currently displayed on desktop interface 202 via search control 206, toolbar 204, a toolbar or tray area on desktop interface 202, etc.

Figure 2E:
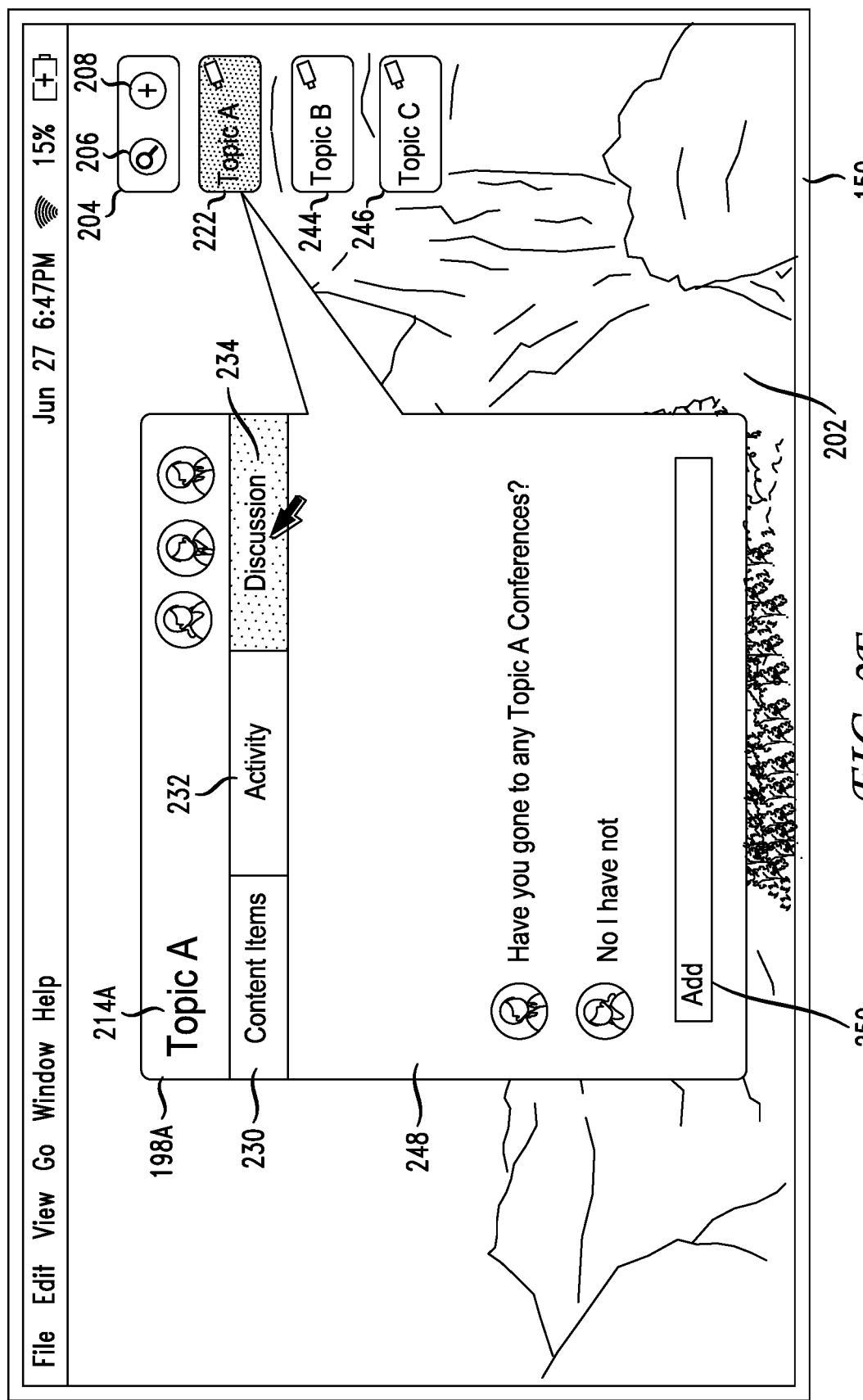
FIG. 2E illustrates a different view of a focus area workspace and multiple focus areas.

Referring to FIG. 2E, discussion tab 234 on workspace 198A can include discussion display area 248 and discussion input area 250. Discussion display area 248 can display current and/or prior discussions contained in workspace 198A. Discussion input area 250 can allow a user to enter text to create or publish a new discussion or message in discussion display area 248. Through discussion tab 234, users can not only track discussions related to the focus area of workspace 198A, but also engage in new discussions and interact with each other.

Figure 2F:
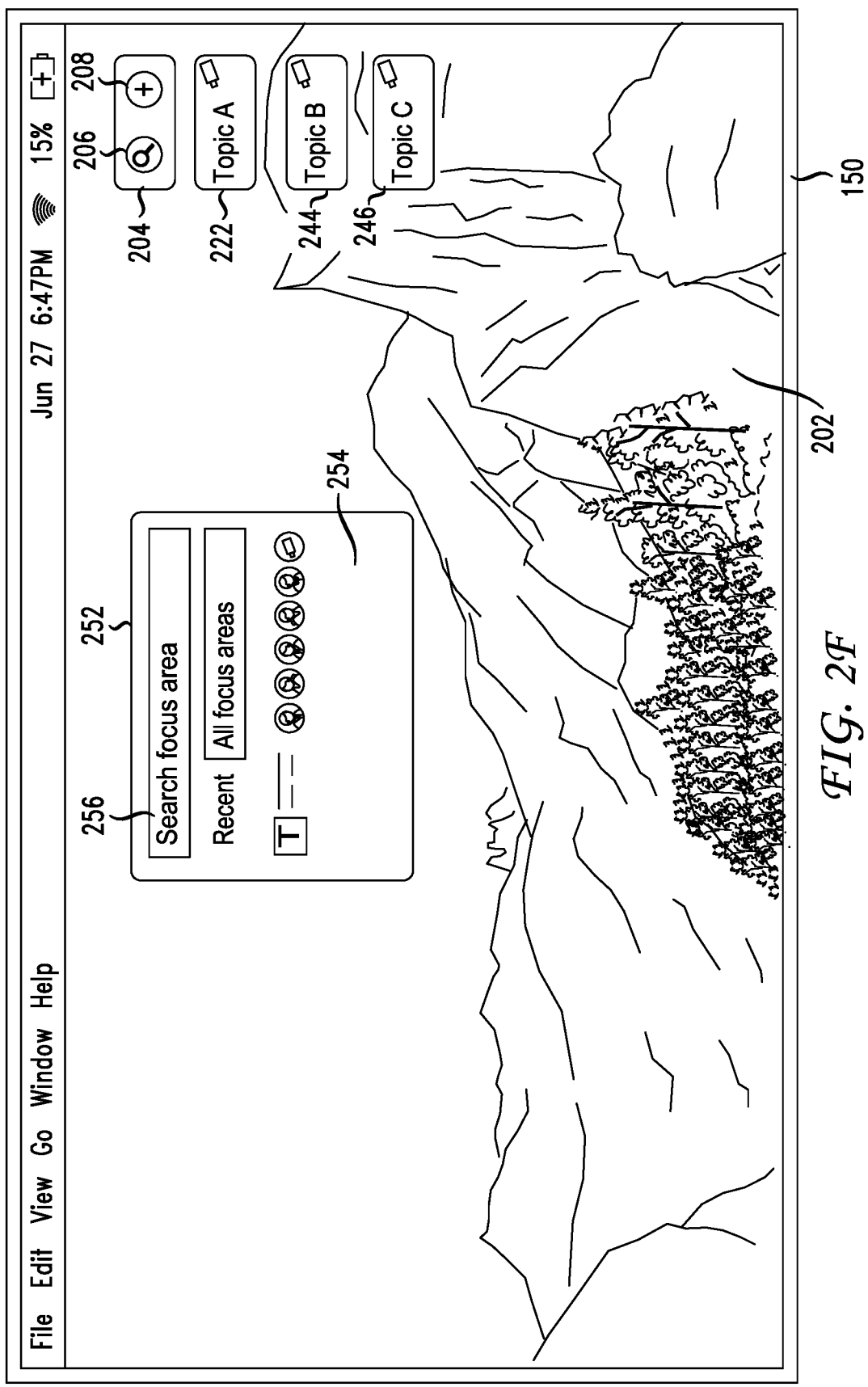
FIG. 2F illustrates an example interface for searching focus areas and focus area items.

As previously mentioned, users can search different focus areas from search control 206 in control element 204. Referring to FIG. 2F, search window 252 can allow users to search focus areas and view results. Search window 252 can include search input area 256 where a user can enter a search term(s) or criteria to use when searching the focus areas. Search window 252 can include search results screen 254, which can display any focus areas found based on the input from search input area 256. Search results screen 254 can also present information about the focus areas found, such membership information, activity information, etc. Users can select a specific focus area within search results screen 254 and launch the specific focus area directly from search results screen 254 and/or have the specific focus area presented or pinned on the desktop.

Search window 252 can also include additional filters for further customizing a focus area search. For example, search window 252 can include a filter based on date, activity, location information, etc.

Figure 3:
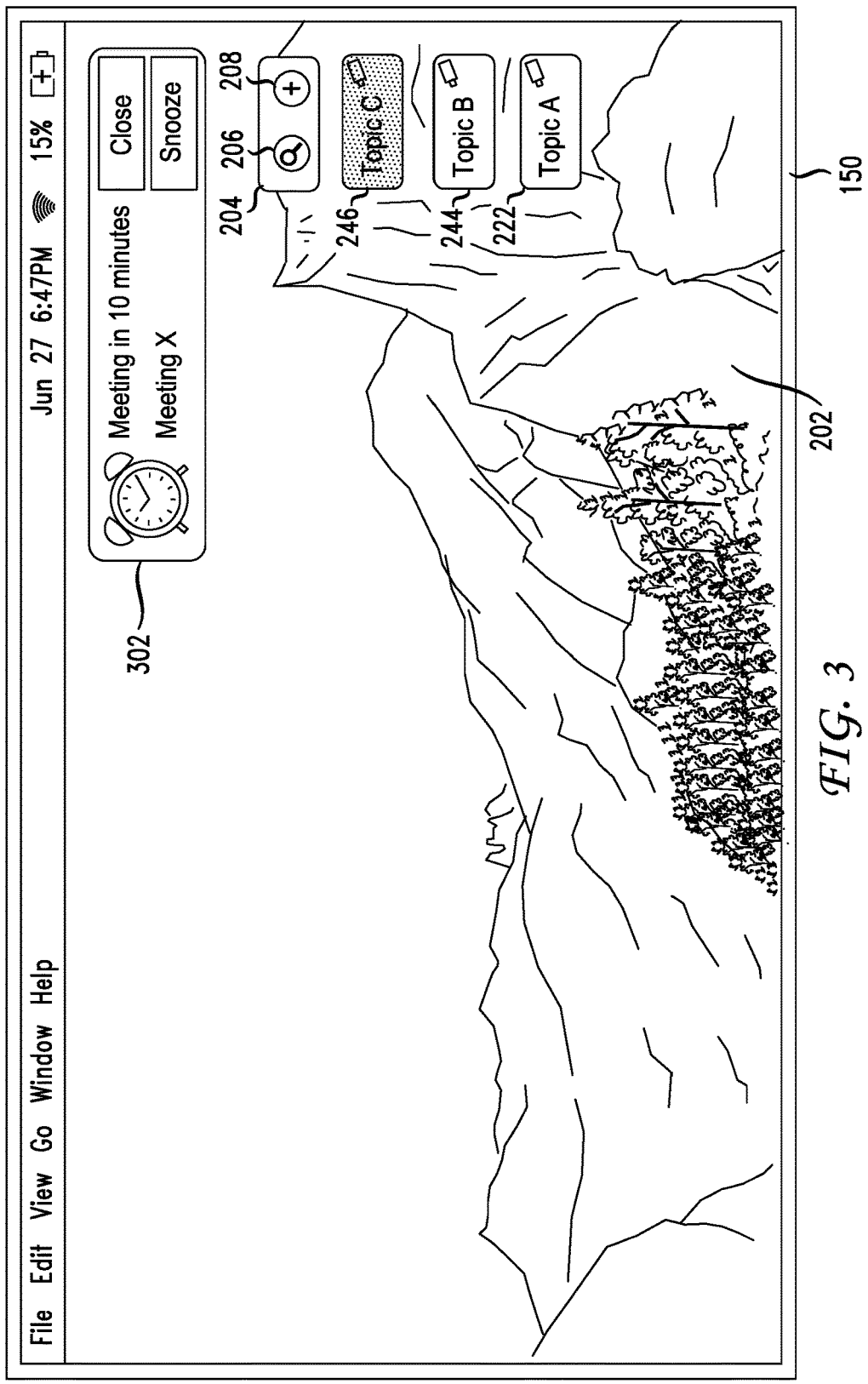
FIG. 3 illustrates an example presentation of a focus area in response to relevant a calendar event.

FIG. 3 illustrates an example focus area application 168 interacting with a calendar application on client device 150. Calendar notification 302 can be presented on the desktop based on an event or calendar entry in a calendar application on client device 150. Focus area application 168 can detect calendar notification 302 and/or the related event or calendar entry and determine that calendar notification 302 relates to the focus area of interface object 246 (e.g., Topic C focus area). For example, focus area application 168 can store a copy or instance of a calendar entry which triggered calendar notification 302 (e.g., focus area application 168 can store an entry within a respective workspace of a focus area) and/or analyze calendar information in a calendar application on client device 150, in order to detect the calendar event associated with calendar notification 302, and relate it to the focus area of interface object 246.

In response, focus area application 168 can generate an indication that allows a user to correlate calendar notification 302 to the focus area of interface object 246. For example, as shown in FIG. 3, interface object 246 can change a visual appearance and/or appear highlighted to indicate that calendar notification 302 relates to the focus area of interface object 246 or indicate some correlation. Focus area application 168 can can also modify in other ways the presentation of focus areas on the desktop in response to calendar notification 302.

For example, focus area application 168 can change the order of the respective interface objects 246, 244, 222 of existing focus areas (e.g., move interface object 246 correlated to calendar notification 302 to be displayed above interface objects 244, 222); display or activate interface object 246 on the desktop interface 202 if it is not already displayed on the desktop interface 202; deactivate, hide, or remove one or more interface objects (e.g., hide interface objects 244, 222 and only present interface object 246, hide one or more interface objects associated with focus areas that have not been used or active within a threshold period of time, hide one or more interface objects corresponding to the X number of least-used focus areas, hide one or more interface objects corresponding to the X number of least-recently, last-used, or last-active focus areas, etc.); hide one or more interface objects when the number of interface objects displayed on desktop interface 202 exceeds a threshold number, which can be defined by one or more factors such as user preferences, display size or resolution, focus area priorities, focus area usage history, etc.

In some cases, if calendar notification 302 can be correlated to a particular content item in the focus area of interface object 246, focus area application 168 can present the content item, automatically open the content item, prompt the user to open the content item, change the appearance of the content item, open the workspace corresponding to interface object 246 and identify the content item, or visually correlate calendar notification 302 with the specific content item in any other way.

Figure 4:
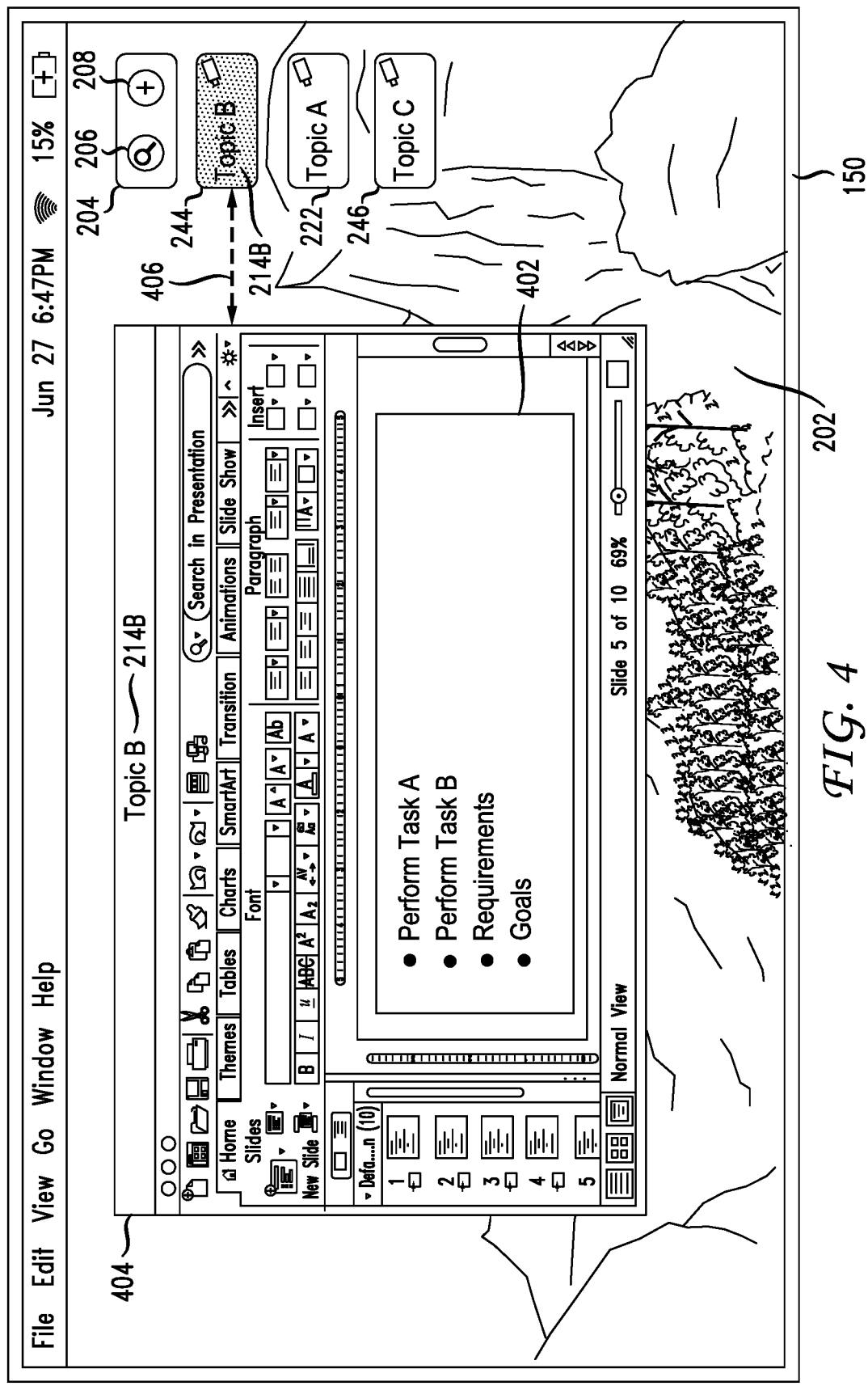
FIG. 4 illustrates an example presentation of a focus area in response to a user interaction with a relevant document.

FIG. 4 illustrates an example view of a focus area interface object during a user interaction with a relevant document. As shown, the user at client device 150 has opened document 404 using a particular software application on client device 150. Document 404 and the focus area corresponding to interface object 244 both relate to topic 214B. Focus area application 168 can detect that document 404 is open on client device 150 and relates to the focus area corresponding to interface object 244. For example, focus area application 168 can detect that document 404 is open and analyze content 402 of document 404 and/or any other parameters of document 404, to determine that document 404 is active and pertains to topic 214B. Focus area application 168 can then make association 406 between document 404 and the focus area corresponding to interface object 244.

Based on association 406, focus area application 168 can modify a presentation of interface object 244 to indicate to the user that document 404 relates to the focus area of interface object 244. In some examples, focus area application 168 can change the appearance of interface object 244 to create a visual association between document 404 and interface object 244. To illustrate, focus area application 168 can highlight interface object 244 on the desktop or change its presentation color (e.g., change from green to red) to create the visual association between document 404 and interface object 244. This way, the user can be dynamically informed that the active document, document 404, is relevant to an existing focus area from focus area application 168. This can also serve as a reminder to the user that document 404 may be added to the focus area of interface object 244 and notify the user that interface object 244 has content items pertinent to document 404.

For example, as the user opens document 404 as part of a project, the user is reminded that the various materials for that project are accessible through interface object 244 and collected into a focus area in focus area application 168. The user does not have to search various applications and locations to find pertinent materials or remember which materials are available pertaining to the user's current work, as focus area application 168 cannot only maintain the relevant materials for the user in an easily accessible focus area, but also highlight the pertinent focus area to the user automatically as the user works related matters on client device 150.

In some cases, focus area application 168 can similarly emphasize interface object 244 if document 404 is already contained in the focus area of interface object 244. For example, if the user opens the workspace associated with interface object 244 and opens a document from the workspace, focus area application 168 can emphasize (e.g., change appearance, modify presentation, generate notification, etc.) interface object 244 to remind the user that document 404 is in the focus area of interface object 244. This way, the user knows which focus area the user obtained document 404 from and is reminded of where the user can access other pertinent materials for that focus area.

Figure 5A:
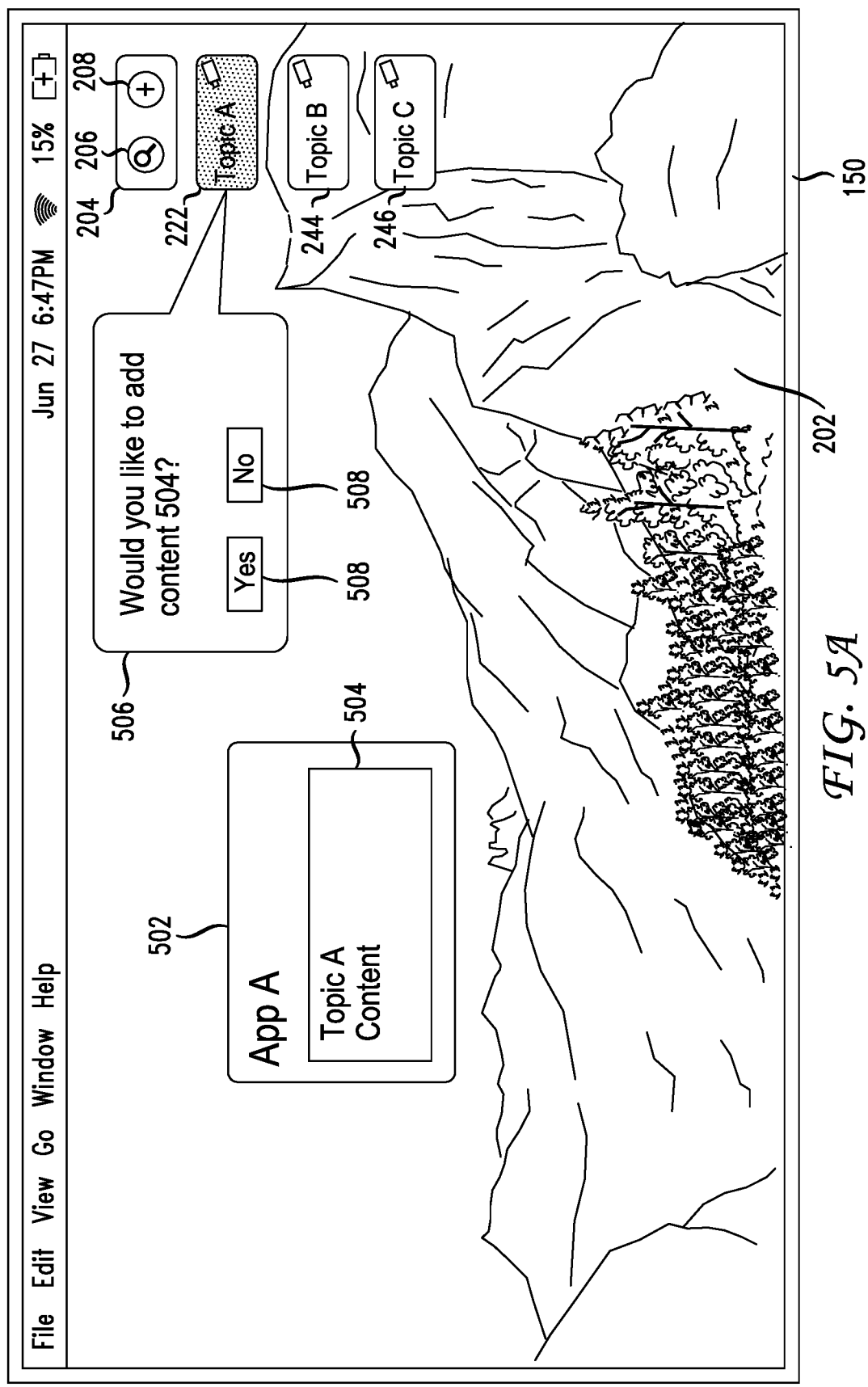
FIG. 5A illustrates an example presentation of a focus area during a user interaction with a different software application.

FIG. 5A illustrates an example view of a focus area interface object during a user interaction with a different software application. As shown in FIG. 5A, the user has launched application 502, which includes application content 504, on client device 150. Application 502 can be a software application on client device 150, and may be separate from focus area application 168. Moreover, application 502 can include application-specific content items in content 504. For example, application 502 can be an email client at client device 150 and content 504 may include emails, calendar entries, tasks, contacts, attachments, etc.

Focus area application 168 can detect that application 502 and/or content 504 relate to the focus area corresponding to interface object 222. For example, focus area application 168 can detect that the focus area corresponding to interface object 222 and application 502 and/or content 504 relate to Topic A. In response, focus area application 168 can emphasize interface object 222 (e.g., highlight, change appearance, etc.), in order to signal to the user that application 502 and/or content 504 is/are relevant to the focus area of interface object 222. Focus area application 168 can also move interface object 222 or display interface object 222 more prominently for the user. For example, focus area application 168 may move interface object to be displayed above interface objects 244, 246, in order to place interface object 222 at the top of a sidebar display of focus areas from focus area application 168.

Focus area application 168 may also generate notifications and/or interact with the user. For example, focus area application 168 may predict that the user may be interested in adding content 504 from application 502 to the focus area of interface object 222 (e.g., add content 504 to the workspace of interface object 222), and generate prompt 506 to the user asking the user of content 504 should be added to the focus area of interface object 222. Prompt 506 can include control elements 508, which the user can select to allow or deny focus area application 168 to automatically add content 504 to the focus area of interface object 222. In some cases, control elements 508 in prompt 506 can provide other options to the user, such as an option to generate a link, share an item in content 504, generate a new focus area based on content 504, provide input which focus area application 168 can use for machine learning (e.g., learn or predict future preferences), etc.

Figure 5B:
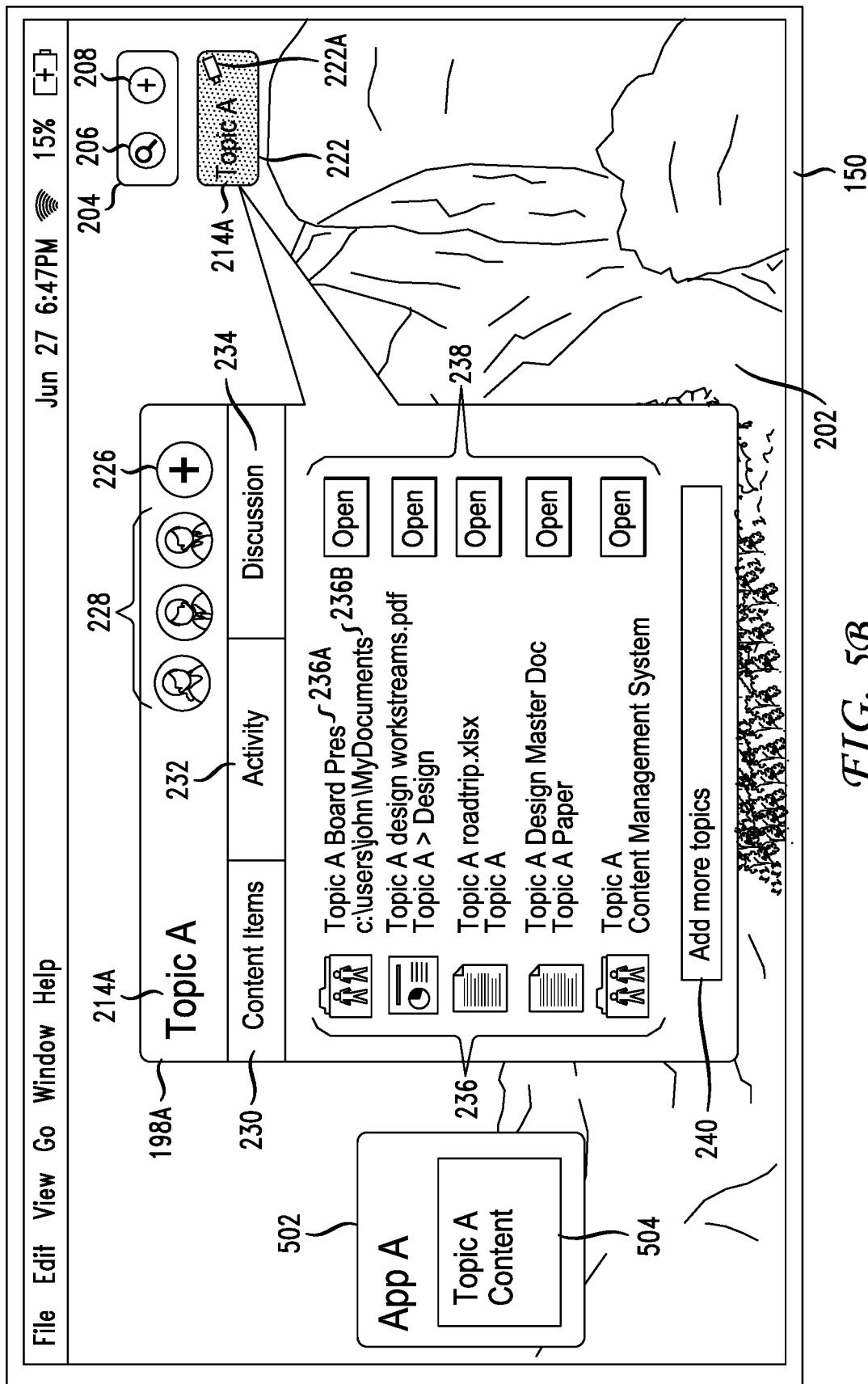
FIG. 5B illustrates an example focus area interface in an example computing context.

Referring to FIG. 5B, focus area application 168 can automatically launch and/or populate workspace 198A associated with interface object 222 based on the association with application 502 and/or content 504. Workspace 198A corresponding to the focus area associated with interface object 222 can present to the user the various materials and collaboration tools related to application 502 and/or content 504. If content 504 is added to workspace 198A, focus area application 168 can automatically display content 504 within workspace 198A and intelligently organize content 504 within workspace 198A. For example, focus area application 168 can automatically group content 504 with other similar content items in workspace 198A, such as other content items related by file type, author, timestamp, subtopics, events, activities, etc.

Figure 6:
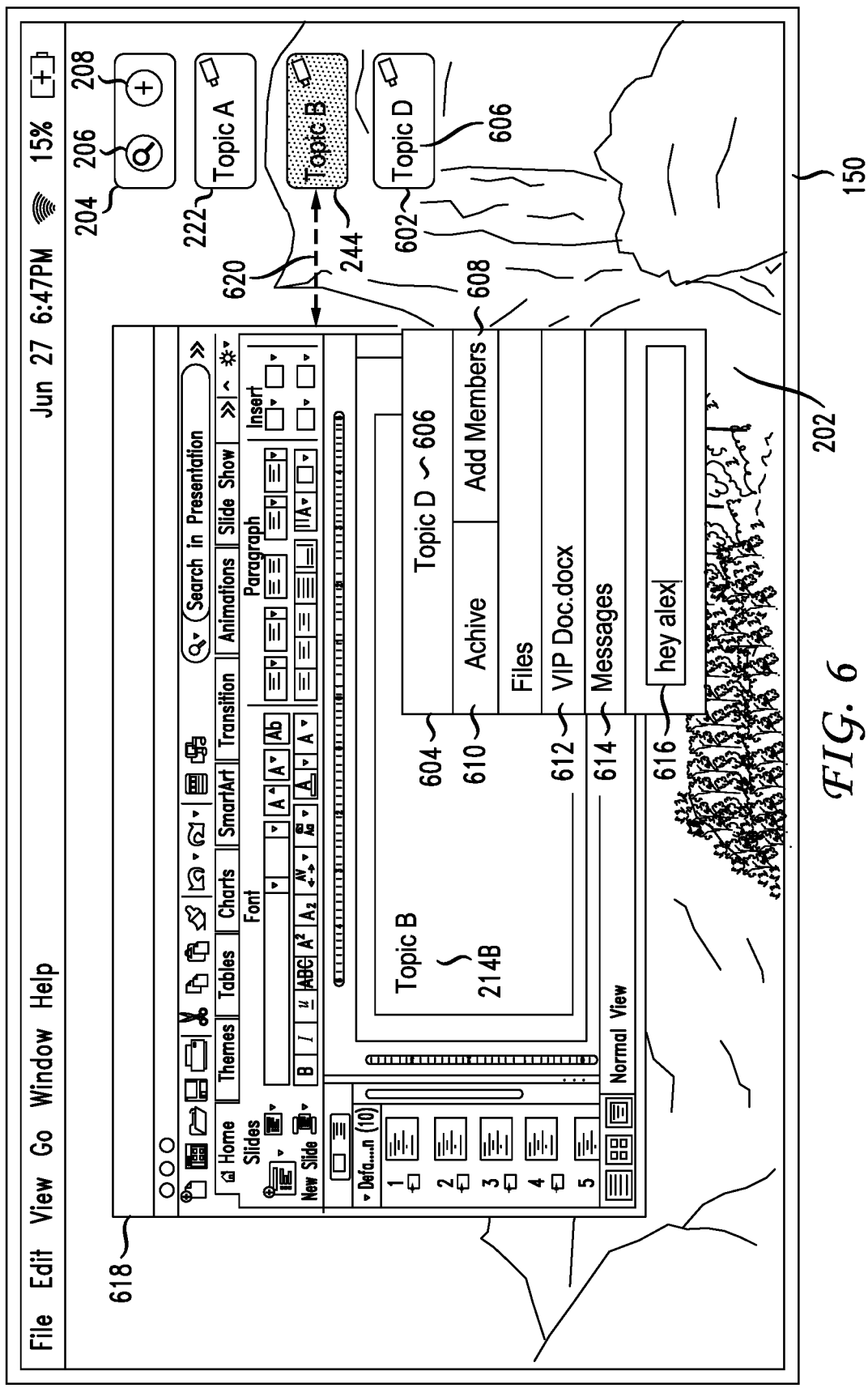
FIG. 6 illustrates different interactions with a focus area application.

FIG. 6 illustrates various example interactions with focus area application 168. For example, focus area application 168 can display interface object 244 in an emphasized mode (e.g., highlighted) to show the focus area of interface object 244 is active in response to detecting document 618 is active and related to topic 214B corresponding to the focus area of interface object 244. This presentation of interface object 244 can provide visual association 620 between an active document, document 618, and a related or active focus area, in this example the focus area of interface object 244.

In addition, focus area application 168 can present focus area window 604 of a new focus area pertaining to focus area topic 606, and interface object 602 corresponding to the new focus area pertaining to focus area topic 606. Focus area window 604 can provide a different workspace for collecting content items and tools for the new focus area, and defining settings for the workspace from focus area window 604.

Focus area window 604 can include archive element 610 for archiving content items and/or retrieving archived content items, and member control element 608 for adding members to the new focus area associated with focus area window 604. New members can be added by entering user account details or member identifiers or selecting members from a presented list of available user accounts. Members can include, without limitation, users having a focus area application user account, a user account with content management system 110, or a user account with a different system or application (e.g., using OAuth authorization).

When a user account is added as member of the focus area associated with focus area window 604, the associated user will have access through the user account to the focus area, such as focus area window 604, interface object 602, and/or related content items and materials. The user will also be able to interact with other users via the focus area (e.g., via focus area window 604). Moreover, the user will be able to access the focus area through the user account from client device 150 and/or any other computing device. For example, if user A adds user B as a member to a focus area, user B will be able to access the focus area and associated content items and materials from any device having installed focus area application 168, such as user B's personal laptop.

Moreover, when a user account is added as member of the focus area associated with focus area window 604, the particular focus area, including focus area window 604 and interface object 602, can be automatically populated and/or configured on any of the user's client device(s) running focus area application 168. The content items for the focus area can also be synchronized between user accounts and devices having membership to the focus area, as well as content management system 110. For example, a user can create a focus area for a project and add a team of members to ensure that everyone on the team has synchronized access to all the relevant content items for the focus area from any of their client devices, and the users can work and collaborate with each other from their own devices in a centralized, intelligent, and organized manner.

Focus area window 604 can include files 612 associated with the focus area. Files 612 can be added by members manually and/or automatically populated by focus area application 168 based on one or more factors, such as focus area topic 606 associated with the focus area, membership information, content or activity information, geographic location information, user account profiles, file types, file or content references, dates, authors, content relationships, links, etc.

Focus area window 604 can also include messages 614 associated with the focus area. Messages 614 can include communications or collaborations generated through focus area window 604 or focus area application 168, as well as communications generated through other applications, such as emails or text messages through separate applications.

Focus area window 604 communications element 616 which allows users to type and transmit new communications, such as text or instant messages, to other members of the focus area. Communications generated through communications element 616 can be published and/or stored in focus area window 604, so users or members can have access to communications and receive communications generated via communications element 616 by any members, including themselves. In some cases, communications element 616 can also enable users to generate outside communications, meaning communications transmitted via protocols and/or applications separate from focus area application 168, such as simple mail transfer protocol (SMTP) messages via a separate or dedicated email server, for example.

Figure 7:
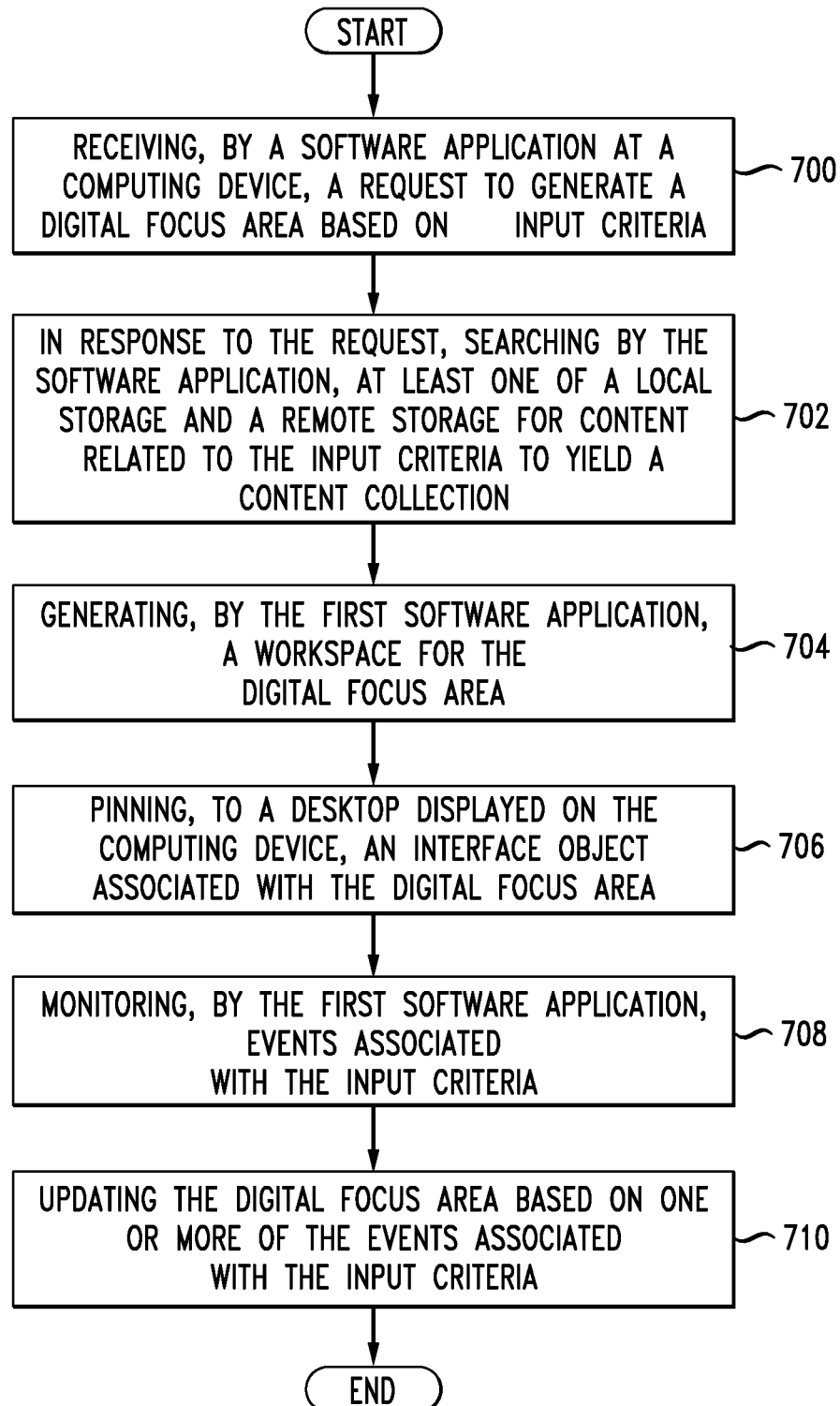
FIG. 7 illustrates an example method embodiment for implementing various embodiments of the present technology.

Having disclosed various system components and concepts, the disclosure now turns to the example method embodiment shown in FIG. 7. For the sake of clarity, the method is described in terms of the client device 150 and focus area application 168, shown in FIGS. 1A and 1B, configured to perform the various steps in the method. The steps outlined herein are exemplary and can be implemented in any combination thereof, including combinations that exclude, add, or modify certain steps.

At step 700, focus area application 168 at client device 150 can receive a request to generate a digital focus area based on an input criteria. The request can include the input criteria. The input criteria can include one or more topics, parameters, subjects, dates, project names, characteristics, values, strings, etc. For example, the input criteria can be a specific topic defined by a user in the input criteria.

In response to the request, at step 702, focus area application 168 can search a local storage and/or a remote storage for content items related to the input criteria to yield a content collection for the digital focus area. The remote storage can be, for example, storage on content management system 110 and/or storage on a remote location such as a remote computer, a cloud datacenter, a server share, a network storage system, etc.

Moreover, the remote storage can include storage on content management system 110 associated with a user account registered at content management system 110. Thus, the content collection can include content items associated with the user account that is shared with other user accounts at content management system 110 and may be synchronized across content management system 110 and different client devices associated with the various user accounts.

The local storage can include local physical and/or logical storage, such as a physical drive, a logical disk, a local filesystem on client device 150, a storage device connected to client device 150 (solid-state drive, USB memory device, portable memory disk, etc.). Focus area application 168 can search the local storage for content items associated with one or more specific software applications as well. For example, focus area application 168 can search content items in a local archive, post office, or file associated with an email client on client device 150 or a database table on client device 150. Thus, the content collection can not only include content items from various locations but also various software applications and services, including other collaboration tools such as SLACK, CISCO SPARK, GOOGLE DOCS, DROPBOX PAPER, iCLOUD, etc.

At step 704, focus area application 168 can generate a workspace (e.g., workspace 198A) for the digital focus area. The workspace can provide centralized access to content items added to the workspace for the digital focus area. In some cases, the workspace can include a local container on client device 150 for storing content items (e.g., content items, preferences, tools, etc.) for the digital focus area. The workspace can store actual copies of content items and/or references or pointers (e.g., symbolic links, shortcuts, network paths, URLs, addresses, etc.) to content items stored outside of the container associated with the workspace (e.g., content items stored on client device 150 outside of a container created for the workspace, content items stored in remote locations, etc.).

The workspace can contain selected content items from the content collection. For example, the workspace can contain the entire content collection or a portion selected by the user and/or filtered by focus area application 168. In some cases, focus area application 168 can provide the content collection as a list of suggested content items to the user and allow the user to specifically approve or deny individual content items from the content collection to be included in the workspace. The user can also add other content items not included in the content collection to the workspace.

The workspace can include a graphical user interface as previously described, for displaying content items in the workspace, organizing content items in the workspace, enabling a user to add or remove content items from the workspace, enable a user to interact with content items in the workspace and/or other users that are members of the workspace and digital focus area, etc. For example, the workspace can organize content items by type, date, author, importance, relevance, etc.

The workspace can also include multiple tabs for allowing the user to access different views or screens, which can be based on a type of content item(s) or functionality, for example. To illustrate, the workspace can include a tab for displaying documents and/or tools related to documents, a tab for displaying communications and/or tools for creating new communications, a tab for displaying activity associated with the digital focus area, a tab for displaying a calendar related to the digital focus area, a tab for displaying sub-topics or projects for the digital focus area, a tab for displaying specific content items selected by a user, a tab for displaying content items based on a status such as a read status or modification status, etc.

At step 706, focus area application 168 can pin to a desktop displayed on client device 150 (e.g., desktop interface 202), an interface object (e.g., interface object 222) associated with the digital focus area. The interface object can provide access to the workspace. For example, the interface object can be selectable to launch the workspace. In some cases, the interface object can be displayed as a note, a card, a list item, a thumbnail, a graphic icon, a geometric shape, a label, a graphic, etc. The interface object can also display a name or topic of the digital focus area associated with the interface object. The name or topic can be based on the input criteria.

At step 708, focus area application 168 can monitor events associated with the input criteria. For example, if the input criteria includes Topic A, then focus area application 168 can monitor events that may be related to Topic A. The events can include computer or user activity, such as documents or applications being used at client device 150, user inputs or gestures, etc.; application events, such as calendar events or reminders, new emails received, etc.; system events; synchronization events; focus area application events; dates; etc.

Focus area application 168 can monitor events related to different applications, such as a calendar application, an email client, a web browser, a conferencing application, a messaging application, a productivity software tool, etc. Focus area application 168 can monitor events within focus area application 168 and/or content items in focus area application 168, as well as events related to other software applications on client device 150, other activity on client device 150, events related to other devices (e.g., content management system 110, client devices having access to content management system 110, client devices running focus area application 168, etc.). Thus, focus area application 168 can monitor activity and events related to the input criteria across software application, device, and/or user boundaries.

At step 710, focus area application 168 can update the digital focus area based on one or more of the events associated with the input criteria. The one or more events can refer to activity and/or events detected by focus area application 168 and related to the input criteria. Moreover, updating the digital focus area can include updating content items and/or the appearance of the workspace, updating the appearance and/or display of the interface object, updating notifications and/or information presented on the desktop relating to the digital focus area, etc.

For example, updating the digital focus area can include changing an appearance of the interface object, such as a color or emphasis, to indicate the digital focus area associated with the interface object is active based on the detected event(s) or related to the detected event(s). To illustrate, if the user starts working on a document contained in the workspace for a digital focus area for Topic A, focus area application 168 can detect this activity and determine that the document is associated with the digital focus area for Topic A and consequently highlight the interface object corresponding to the digital focus area for Topic A to provide a visual association between the current document and the digital focus area for Topic A.

As another example, if a user opens a content item related to Topic A, focus area application 168 can detect this activity and determine that the activity relates to a digital focus area previously created for Topic A. Focus area application 168 can then update the digital focus area based on this association between the digital focus area and the current activity by, for example, automatically opening the workspace associated with the digital focus area, automatically populating the content item opened by the user in the workspace associated with the digital focus area, prompting the user to add the document to the workspace, highlighting the interface object of the digital focus area, moving the interface object to a more prominent location on the desktop (e.g., bringing interface object into foreground or focus, increase a size of the interface object, place the interface object first or on top of other interface objects, etc.

Focus area application 168 can create multiple focus areas for different input criteria, and maintain the different focus areas on client device 150 and/or across other devices. Moreover, focus area application 168 can present multiple interface objects on the desktop for view and access to the different focus areas by the user. For example, focus area application 168 can pin interface objects for different focus areas on the desktop, and the interface objects can identify or represent the different focus areas through, without limitation, labels, tags, icons, symbols, appearances, etc.

In some cases, focus area application 168 can display a sidebar on the desktop which can include different interface objects for corresponding to the digital focus areas on client device 150 and/or associated with a user account authenticated for use with focus area application 168. In this example, the sidebar can also display other interface elements or objects, such as control elements for creating or searching focus areas, changing focus area settings, changing account settings, changing membership settings, etc.

Moreover, focus area application 168 can run as a service on client device 150, and can perform various functionalities, such as monitoring functionalities, in the background. The user can also have control over where, when and/or how any user interface elements or objects associated with focus area application 168 are displayed on client device 150. For example, the user can control the presentation size of interface objects or labels for digital focus areas, the display location within the screen (e.g., minimized, maximized, on a side of the screen, on the bottom of the screen, etc.), the display format (e.g., panels, bubbles, tiles, notes, taskbar, icons or thumbnails, clouds, geometric shapes, list format, etc.), presentation during (e.g., permanently pinned to an area on the desktop, display interface objects only for focus areas that are relevant based on a current context or activity, display interface objects only while in use, display interface objects only for a period of time, etc.), and so forth.

FIG. 8 illustrates an example computing system architecture 800 wherein the components of the system are in communication with each other using a connection 805. Connection 805 can be a physical connection via a bus, or direct connection into processor 810 such as in a chipset architecture. Connection 805 can also be a virtual connection, networked connection, or logical connection.

In some embodiments 800 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 800 includes at least one processing unit (CPU or processor) 810 and a connection 805 that couples various system components including the system memory 815, such as read only memory (ROM) and random access memory (RAM) to the processor 810. The system 800 can include a cache of high-speed memory connected directly with, in close proximity to, or integrated as part of the processor 810.

The processor 810 can include any general purpose processor and a hardware service or software service, such as service 1 832, service 2 834, and service 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as the processor 810, bus 805, display 835, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

As used herein, claim language reciting "at least one of" a first item "and" a second item indicates that the first item, the second item, or both the first and second item satisfy the claim. For example, claim language reciting "at least one of A or B" indicates that either a set of A or B (e.g., A only or B only) or a set of A and B (e.g., both A and B) can satisfy the claim.

What is claimed is:

1. A computer-implemented method comprising:
   receiving, by a client application associated with a content management system at a computing device, a request to generate a digital focus area based on input criteria, wherein the input criteria includes a search query;
   in response to the request and the search query, searching, by the client application, at least one of a local storage and a remote storage for content items related to the input criteria to yield a content collection, the remote storage being associated with a user account registered at the content management system;
   generating, by the client application, the digital focus area including a workspace based on the request, the workspace containing selected content items from the content collection including content items associated with the client application and a second software application;
   pinning, to a desktop displayed on the computing device, an interface object associated with the digital focus area, the interface object providing access to the workspace;
   monitoring, by the client application, activity on the computing device to identify updates to the content collection associated with the input criteria; and
   updating the digital focus area based on the identified updates to the content collection associated with the input criteria, including content items associated with the client application and the second software application and wherein updating the digital focus area includes modifying a display status of the interface object in response to detecting an interaction with the content items related to the input criteria, the display status indicating that the content items are relevant to the digital focus area associated with the interface object.

2. The method of claim 1, wherein pinning the interface object to the desktop comprises pinning the interface object to a sidebar displayed on the desktop, the sidebar being associated with the client application.

3. The method of claim 1, wherein the second software application comprises one of a calendar application, a web browser, a conferencing application, or a productivity software tool.

4. The method of claim 1, wherein the remote storage comprises at least one of a first storage at the content management system, a second storage associated with a cloud computing service, or a third storage associated with the second software application.

5. The method of claim 1, wherein the identified updates to the content collection comprises a user interaction with the content items related to the input criteria.

6. The method of claim 1, further comprising:
   detecting updates to the content collection associated with the input criteria; and
   presenting a notification on the desktop, the notification being associated with the updates to the content collection.

7. The method of claim 1, wherein the workspace comprises an interface for storing and accessing the content collection, the content collection comprising at least one of related content items, related events, or related communications.

8. The method of claim 1, further comprising:
   granting one or more users or user accounts access to the digital focus area by adding the one or more users or user accounts as members of the digital focus area,
   wherein the workspace comprises an interface for interacting with the one or more users or user accounts, the workspace being configured to store communications and activity corresponding to interactions with the one or more users or user accounts.

9. The method of claim 1, wherein the input criteria further comprises at least one of a topic, a parameter, a date, a file type, a user, or a content source.

10. The method of claim 1, wherein the workspace comprises a workspace interface, the workspace interface comprising one or more interface objects for interacting with the workspace, a first panel or tab for accessing documents from the content collection, a second panel or tab for accessing events related to at least one of the input criteria and the content collection, and a third panel or tab for accessing communications between one or more members of the digital focus area.

11. A system comprising:
    one or more processors; and
    at least one computer-readable medium storing instructions which, when executed by the one or more processors, cause the system to:
      receive a request to generate a digital focus area based on an input criteria, wherein the input criteria includes a search query;
      in response to the request and the search query, search at least one of a local storage and a remote storage for content related to the input criteria to yield a content collection, the remote storage being associated with a user account registered at a content management service;
      generate the digital focus area including a workspace based on the request, the workspace containing selected content from the content collection including content items associated with a client application associated with a content management system and a second software application;
      generate an interface object associated with the digital focus area for presentation at a desktop interface, the interface object being configured to provide access to the workspace from the desktop interface;
      monitor activities to identify updates to the content collection associated with the input criteria; and
      update the digital focus area based on the identified updates to the content collection associated with the input criteria, including content items associated with the client application and the second software application and wherein updating the digital focus area includes modifying a display status of the interface object in response to detecting an interaction with the content items related to the input criteria, the display status indicating that the content items are relevant to the digital focus area associated with the interface object.

12. The system of claim 11, wherein generating the interface object comprises instructing the client application on a client device associated with the desktop interface to pin the interface object to a sidebar on the desktop interface.

13. The system of claim 11, wherein the second software application comprises one of a calendar application, a web browser, a conferencing application, or a productivity software tool.

14. The system of claim 11, wherein the activity comprises a user interaction with a content item related to the input criteria.

15. The system of claim 11, wherein the at least one computer-readable medium stores additional instructions, which, when executed by the one or more processors, cause the system to:
  detect a calendar event associated with the input criteria; and
  provide a notification associated with the calendar event for presentation at a desktop display.

16. A non-transitory computer-readable storage medium comprising:
  a client application associated with a content management system comprising computer-readable instructions, which, when executed by one or more processors, cause the one or more processors to:
    receive a request to generate a digital focus area based on input criteria, wherein the input criteria includes a search query;
    in response to the request and the search query, search at least one of a local storage and a remote storage for content related to the input criteria to yield a content collection, the remote storage being associated with a user account registered at the content management system;
    create the digital focus area including a workspace based on the request, the workspace containing selected content from the content collection including content items associated with the client application and a second software application;
    present, on a desktop displayed, an interface object associated with the digital focus area, the interface object providing access to the workspace;
    detect activity on the system associated with the input criteria; and
    update the digital focus area based on the detected activity associated with the input criteria, including content items associated with the client application and the second software application and wherein updating the digital focus area includes modifying a display status of the interface object in response to detecting an interaction with the content items related to the input criteria, the display status indicating that the content items are relevant to the digital focus area associated with the interface object.

17. The non-transitory computer-readable storage medium of claim 16, wherein the workspace comprises an interface for accessing the content collection, the content collection comprising at least one of related files, related documents, related events, or related communications, and wherein detecting the activity associated with the input criteria comprises monitoring events associated with the second software application.

18. The non-transitory computer-readable storage medium of claim 16, the client application comprising additional computer-readable instructions, which, when executed by the one or more processors, cause the one or more processors to:
  grant one or more members access to the digital focus area,
  wherein the workspace comprises an interface for establishing communications with the one or more members and storing the communications within a content container associated with the workspace.

19. The non-transitory computer-readable storage medium of claim 16, wherein the remote storage comprises at least one of a first storage at the content management system, a second storage associated with a cloud computing service, or a third storage associated with a third software application.

* * * * *